May 14, 1963
J. G. SEVCIK
3,089,151
ROLL-AWAY BED
Filed Jan. 30, 1961
4 Sheets-Sheet 3
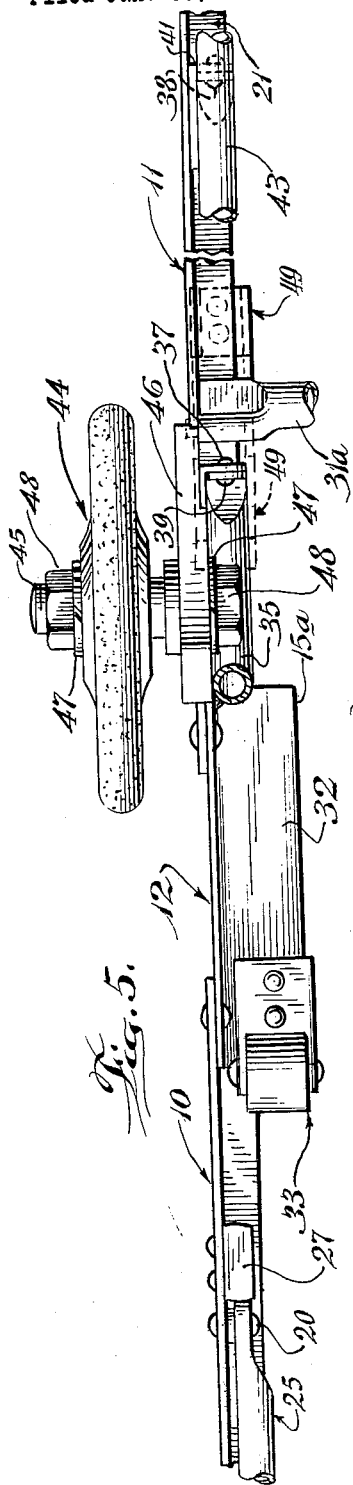
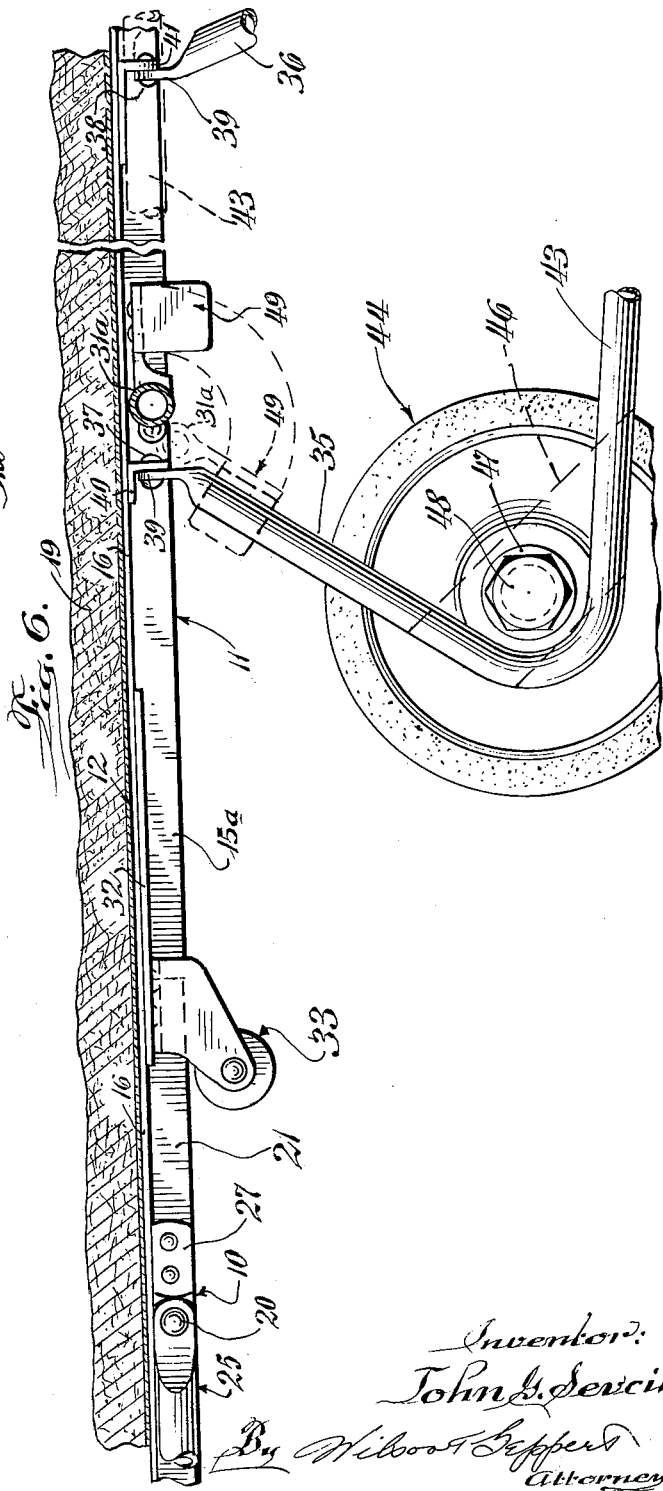
Inventor:
John G. Sevcik
By Wilbert Geppert
Attorneys.

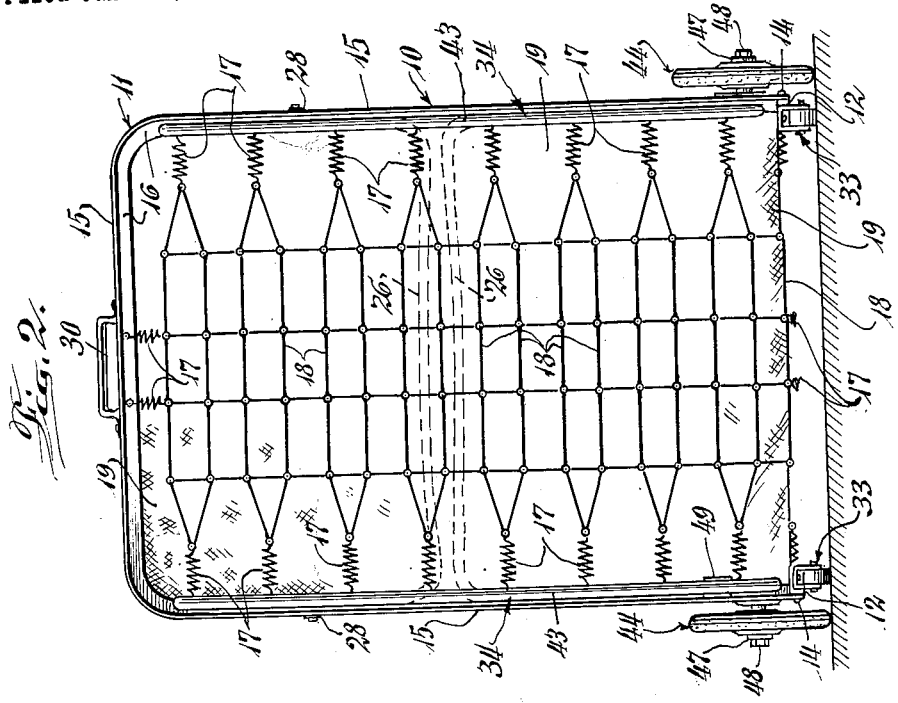

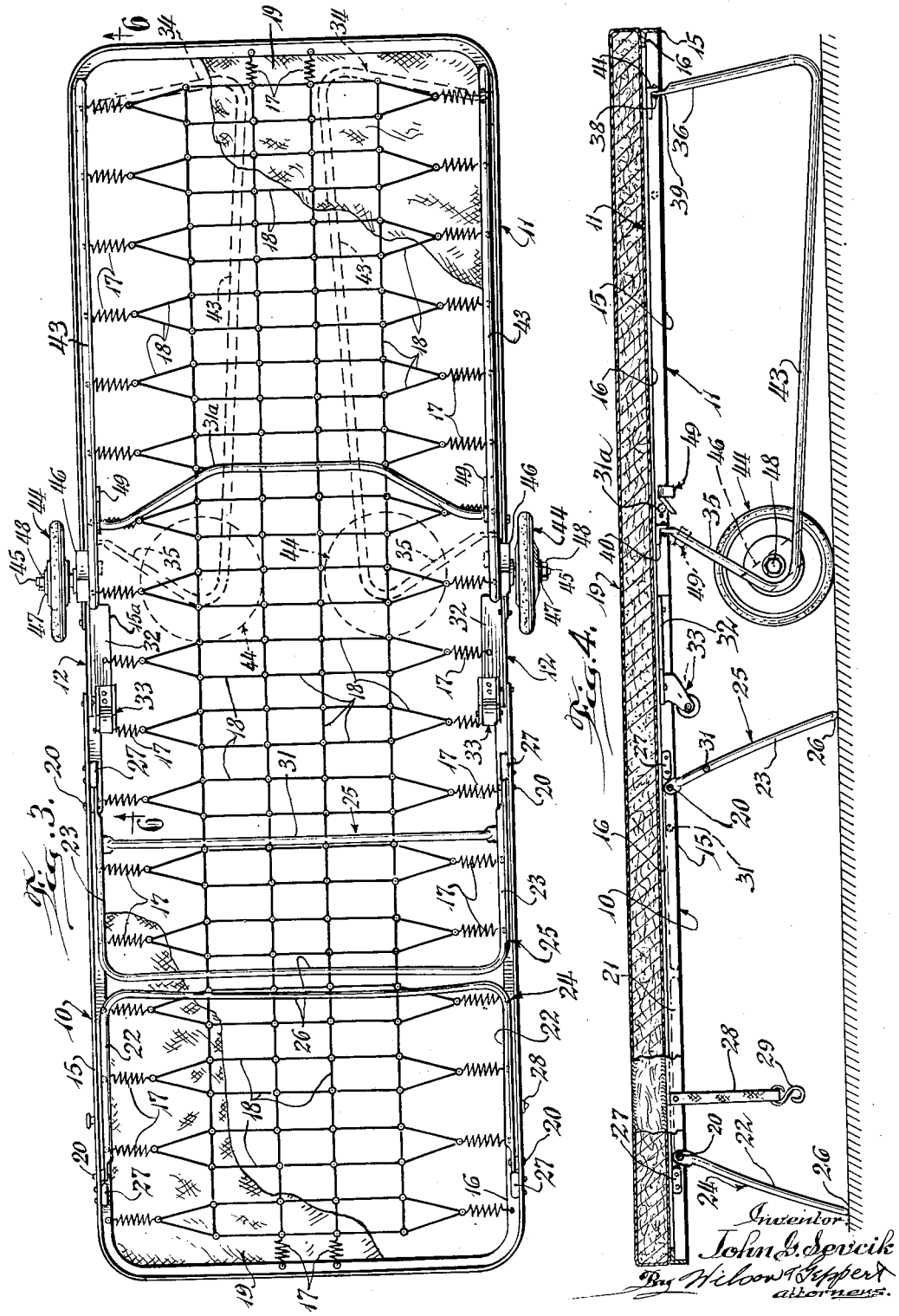

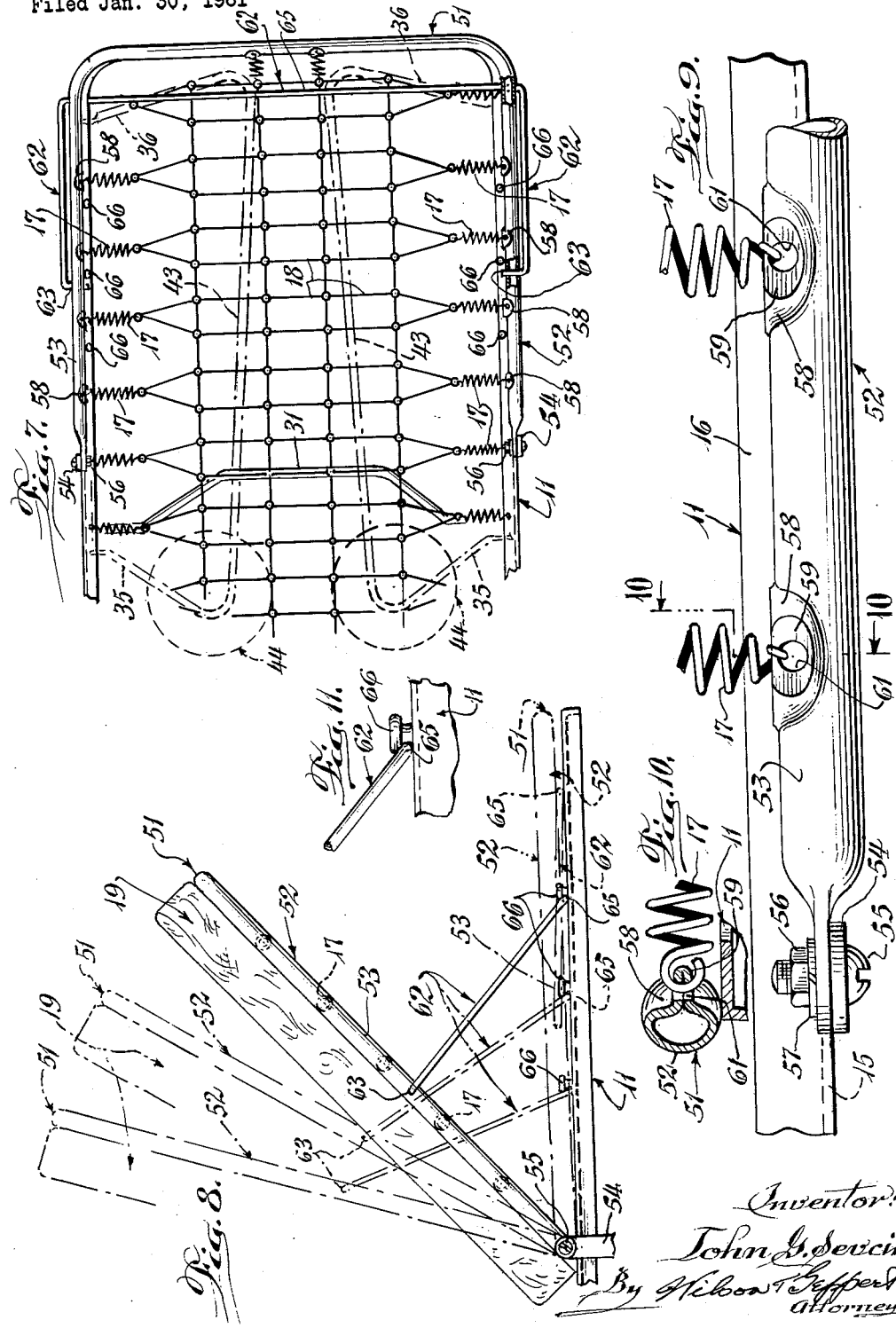

United States Patent Office 3,089,151
Patented May 14, 1963

3,089,151
ROLL-AWAY BED
John G. Sevcik, Berwyn, Ill., assignor to Burton-Dixie Corporation, Chicago, Ill., a corporation of Delaware
Filed Jan. 30, 1961, Ser. No. 85,864
3 Claims. (Cl. 5—149)

The present invention relates to a novel collapsible and roll-away bed having articulated sections which may be readily folded or collapsed for transportation or storage, and extended for use, the bed having novel wheeled supports which also are readily folded to inoperative position whereby the bed and the wheeled supports when fully collapsed occupy a minimum of space for storage in vertical or horizontal position.

Among the objects of the present invention is the provision of a novel roll-away or mobile bed which together with its mattress and wheeled supports may be collapsed into a narrow space so that when collapsed and laid flat it may be stored under a bed or other place where limited vertical space is available, or stored in upright position and occupy substantially less space than required for prior types of roll-away beds.

The present invention further comprehends a roll-away bed having articulated end and intermediate sections with one of the end sections having at each side a novel collapsible wheeled support which when moved to extended or operative position provides novel means for supporting the folded bed in upright position, for transporting the folded bed to storage or wherever the bed is to be unfolded for use, and when the bed is opened for use, effectively supporting said end section of the bed. These wheeled supports are so pivotally mounted that when not in use and functioning as above described they are folded or collapsed flat against the end section of the bed frame to decrease the overall dimensions and facilitate storage of the bed assembly.

Another important object of the present invention is the provision of a roll-away or collapsible bed and mattress, the bed comprising articulated frame sections in which the end sections fold upwardly and inwardly about the ends of a narrow intermediate or central section to thereby collapse the bed and its mattress into a narrow space, one of the end frame sections having substantially U-shaped transversely extending supports with each leg of a support pivotally mounted on a side rail of one end section, and the second end section of the frame having pivotally mounted upon a side rail of its frame the spaced legs of a substantially U-shaped support extending longitudinally with the legs of each support being pivotally mounted upon one side rail of its end frame section so that when these latter supports are not in use they are folded inwardly onto its end frame section to conserve storage space.

In this novel embodiment, each substantially U-shaped support on the second end frame section carries a wheel adjacent its inner leg and its outer leg providing a handle to be grasped for moving the collapsed or folded bed about upon these wheels when these supports are opened to operative position. When the bed is opened for use each wheel and the other end of its support rests upon the floor and provides a rigid base for supporting one end of the bed.

Another important object of the present invention is the provision in the novel roll-away bed of a novel head or back rest for the bed having means for adjustably retaining the head or back rest at various elevated and inclined positions for supporting the occupant or patient in position for reclining or reading.

The present invention further comprehends a novel tubular fame for the support of a head or back rest assembly, and in the novel means and manner of forming and pinching the tubular frame at spaced points to provide thereat flattened abutting flanges apertured to receive and anchor one end of the coil springs to the other end of which springs is tensionally connected the wire link fabric spanning the head or back rest.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in end elevation of the novel assembly of a portable or roll-away bed and contained mattress folded and made ready for transportation to a position for use or storage, and also shown in dotted outline in a tilted position for moving it from place to place upon its wheels.

FIG. 2 is a view in front elevation of the folded bed and mattress assembly of FIG. 1.

FIG. 3 is a bottom plan view of the assembly of FIG. 2 extended or opened except for the legs on the left end section which appear in their folded, inoperative position, and also showing in dotted outline the manner in which the wheels and their supports are folded inwardly to inoperative or fully collapsed position.

FIG. 4 is a view in side elevation of the completely opened bed and mattress.

FIG. 5 is an enlarged fragmentary plan view of the upper side rail of the bed frame assembly and associated parts as viewed in FIG. 3.

FIG. 6 is a view in side elevation of the portion of the frame assembly of FIG. 5, the view being taken on the line 6—6 of FIGS. 3 and 5 and viewed in the direction of the arrows.

FIG. 7 is a fragmentary top plan view of one end of the bed frame provided with a pivoted attachment or back rest adjustable to and held at various inclined positions for supporting the head and the upper part of the body of the occupant in various elevated positions.

FIG. 8 is a view in side elevation of the elevated attachment or back rest shown disposed and anchored in one elevated position but also showing in dotted outline other positions of adjustment by means of a supporting bar.

FIG. 9 is an enlarged fragmentary top plan view of one of the spaced arms of the tubular supporting frame of the back rest attachment and showing the manner in which the inner periphery of the tube is pinched and apertured at spaced points to receive an end of the transverse springs for tensionally holding the wire link fabric.

FIG. 10 is a view in vertical cross section taken on the line 10—10 of FIG. 9 and viewed in the direction of the arrows.

FIG. 11 is an enlarged fragmentary view showing the manner in which the supporting bar retains the back rest support elevated.

Referring to the detailed disclosure in the drawings and to the novel illustrative embodiment therein shown, the present invention comprises a portable or roll-away bed having articulated end frame sections 10 and 11 referred to for convenience as the lower and upper end sections, and an intermediate frame section 12 pivotally connected to the end sections at 13 and 14.

Each of the articulaed end bed frame sections 10 and 11 comprises encompassing angle frame members 15 each having an upper horizontal leg or flange 16 projecting inwardly and having spaced apertures each adapted to receive one end of conventional coil springs 17, the other end of these coil springs being attached to conventional wire link fabric 18 for yieldably supporting a mattress 19.

Pivotally mounted at 20 on the depending flange 21 of the opposite side rails or angle members 15 of the end section 10 are the upper end of spaced legs 22 and 23 of a pair of substantially U-shaped tubular supports or supporting members 24 and 25 each when unfolded to its inclined, depending position (FIG. 4) having its horizontal base 26 resting upon the floor transversely of the bed for supporting this end section. When the bed is not in use, these supports 24 and 25 are folded upwardly or inwardly and suitably retained against the underside of the end frame section 10 as shown in FIG. 3.

Adjacent the pivotal mounting 20 of each leg there is provided a stop 27 against which the leg abuts when the supports 24 and 25 are opened whereby to maintain the legs 22 and 23 of these supports against collapse in one direction when extended to depending position. Also pivotally or loosely mounted on the depending flange 21 of the angle members 15 of the end frame section 10 is one end of a strap 28 having a hook or connector 29 at its other end adapted to engage a part on the other end section 11 to maintain the bed folded or collapsed as shown in FIG. 1. This end section may also be provided with a handle 30 (FIGS. 1 and 2) to facilitate opening and closing of the bed.

To add rigidity or stability to the bed suitable cross braces 31 and 31$^a$ are preferably provided. The cross brace 31 spans and joins the legs 23 of the support 25 and the cross brace 31$^a$ spans the side rails of the other end frame section 11.

The intermediate articulated section 12 is of relatively short length to provide a narrow or thin and compact bed assembly when collapsed, permitting easy storage and in a minimum of space. The horizontal flange 32 on each of its angle members or side rails 15$^a$ is of greater width than the horizontal flanges 16 of the end sections 10 and 11, and each securely mounts and supports on its underside the supporting base of a caster 33. These casters help to support and add to the mobility of the collapsed bed in upright position as shown in FIGS. 1 and 2, but are elevated above and out of contact with the floor when the collapsed bed is tilted for transportation (FIG. 1), or when the bed is opened for use (FIG. 4).

The supporting means for elevating the end frame section 11 above the floor comprises a substantially U-shaped support 34 extending longitudinally of the bed at each side of this frame section with the longitudinally spaced legs 35 and 36 of each pivotally mounted at 37 and 38, respectively, on the angle members or side rails 15. Each support 34 is of tubular construction with the ends 39 of the legs 35 and 36 flattened and pivoted at 37 and 38 upon angle brackets 40 and 41, respectively, affixed to the side rails 15. To the inner end of each tubular support 34 and where the leg 35 and the longitudinal connecting portion 43 of the support joins at an acute angle, there is mounted a rubber-tired wheel 44 freely rotatable on a stub shaft 45 mounted in a bar or plate 46 welded or otherwise rigidly affixed to its tubular support 34. The stub shaft 45 is shown threaded at each end to receive a suitable washer 47 and a lock nut 48 for retaining the wheel.

When the supports 34 are moved to operative position, i.e. as shown in FIGS. 1 and 2 where the collapsed bed is supported upon or moved about upon the wheels 44, or as shown in FIG. 4 where the bed is opened for use, means are provided for retaining these supports and wheel assembly in their operative or depending position. This comprises a substantially U-shaped locking clip 49 pivotally mounted upon the adjacent end of the cross brace 31$^a$ and swingable from its unlocked position shown in full lines to its locked position shown in dotted lines in FIG. 6.

In FIGS. 7 to 11, inclusive, the end section 11 is shown provided with an attachment in the form of an adjustable back or head rest 51 comprising a substantially U-shaped tubular frame 52 having its opposite ends or legs 53 flattened and pivotally mounted on an upstanding bracket 54 by means of a bolt 55, lock nut 56 and lock washer 57. This tubular frame is pinched at longitudinally spaced points 58 to thereat provide flattened, abutting flanges 59 having aligned openings 61 receiving one end of a coil spring 17 with the other end of these multiple springs affixed to and tensioning conventional wire link fabric 18 spanning the tubular frame.

The back rest 51 is retained in any one of a plurality of elevated inclined positions by means of a substantially U-shaped support or retaining bracket 62 having its opposite inturned ends 63 loosely received in apertures 64 in the spaced legs 53 of the back rest. The base or transverse connecting portion 65 of the bracket 62 is adapted to seat against an aligned pair of spaced headed stops 66 projecting upwardly from the top flange 16 of the side rails 15 as shown in FIG. 8.

When the back rest 51 is not in use, it and its supporting bracket are collapsed or folded substantially flat onto the top flanges 16 of the side rails 5.

Having thus disclosed the invention, I claim:

1. A roll-away bed adapted to be unfolded and extended for use and folded into a compact and relatively thin or narrow assembly when made ready for transportation to another location or for storage, comprising an articulated bed frame including end sections of substantially equal length and a pivotally connected intermediate section of short length to conformably receive within said connected sections a collapsible mattress, said end sections having side rails pivotally connected and foldable upwardly about the intermediate section when the bed is not in use to provide a compact assembly for moving about and for storage, one of said end sections having pivotally mounted and transversely extending U-shaped supports and the other having a pair of pivotally mounted and longitudinally extending substantially U-shaped supports with one at each side of said other end section with each of said supports extending for substantially the length of said one section and having a relatively large wheel at the exterior of the side rails at its inner end and a part providing a handle adjacent its outer end for tilting and moving the folded bed about on its wheels when the bed is collapsed with the sections folded together, said handles and large wheels supporting the respective end section when the bed and supports are unfolded and extended for use, means pivotally mounting each end of each support onto an adjacent side rail of the bed frame so that each of said wheel supports is foldable inwardly toward the longitudinal center of said end section when not in use to provide a compact collapsed bed assembly, and a locking clip mounted on said bed frame to move from an inactive position to a locking position to engage and hold said unfolded wheel supports in their operative position.

2. A roll-away bed as set forth in claim 1, in which a caster is mounted on each side of said intermediate section and spaced from said relatively large wheel, whereby said casters and wheels support the collapsed and folded bed in upright storage position.

3. A roll-away bed as set forth in claim 1, in which said locking clip for the wheel supports includes a member pivotally and swingably mounted at one end to each side of the bed frame adjacent the lower pivotal connection of each wheel support and adapted to engage a portion of a wheel support when swung from an inoperative position to an operative position where each locking clip engages one of the wheel supports in its operative position.

References Cited in the file of this patent

UNITED STATES PATENTS

| | | |
|---|---|---|
| 1,337,580 | Ball | Apr. 20, 1920 |
| 1,447,294 | Cole | Mar. 6, 1923 |
| 1,475,860 | Oliver | Nov. 27, 1923 |
| 1,818,395 | Herz | Aug. 11, 1931 |
| 1,818,598 | Berry | Aug. 11, 1931 |
| 2,264,006 | Probst | Nov. 25, 1941 |
| 2,565,027 | Jensen | Aug. 21, 1951 |
| 2,948,905 | Sevcik | Aug. 16, 1960 |

FOREIGN PATENTS

| | | |
|---|---|---|
| 990,506 | France | June 6, 1951 |
| 176,957 | Austria | Dec. 10, 1953 |